(12) United States Patent
Hinterberger et al.

(10) Patent No.: US 10,361,466 B2
(45) Date of Patent: Jul. 23, 2019

(54) SMART BATTERY CELL OF A BATTERY FOR A MOTOR VEHICLE

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 126 days.

(21) Appl. No.: 15/549,274

(22) PCT Filed: Feb. 16, 2016

(86) PCT No.: PCT/EP2016/053217
§ 371 (c)(1),
(2) Date: Aug. 7, 2017

(87) PCT Pub. No.: WO2016/131797
PCT Pub. Date: Aug. 25, 2016

(65) Prior Publication Data
US 2018/0026315 A1    Jan. 25, 2018

(30) Foreign Application Priority Data
Feb. 18, 2015    (DE) .................. 10 2015 002 149

(51) Int. Cl.
*H01M 14/00*        (2006.01)
*H01M 10/42*        (2006.01)
(Continued)

(52) U.S. Cl.
CPC ....... *H01M 10/4257* (2013.01); *B60L 3/0046* (2013.01); *B60L 50/64* (2019.02);
(Continued)

(58) Field of Classification Search
CPC ......... H01M 10/4257; H01M 10/0525; H01M 10/48; H01M 10/486; H01M 2/345;
(Continued)

(56) References Cited

U.S. PATENT DOCUMENTS 8,587,907 B2    11/2013    Gaben
9,222,985 B2    12/2015    Kang et al.
(Continued)

FOREIGN PATENT DOCUMENTS

DE    102010045037 A1    3/2011
DE    102012206622 A1    10/2013
(Continued)

OTHER PUBLICATIONS

Examination Report dated Aug. 19, 2015 of corresponding German application No. 102015002149.4; 5 pgs.
(Continued)

*Primary Examiner* — Raymond Alejandro
(74) *Attorney, Agent, or Firm* — Maier & Maier, PLLC

(57) ABSTRACT

A battery cell for a battery of a motor vehicle having a battery cell housing, in which a galvanic element is accommodated. The battery cell can be electrically connected to at least one other battery cell of the battery by way of two electrical connections. The battery cell has at least one switching element, which is designed for making and breaking a conductive electrical connection between an arrester of the galvanic element and at least one of the electrical connections. A driver module is disposed inside the battery cell housing to control the switching element so that the conductive electrical connection between the arrester and the electrical connections are controlled.

8 Claims, 1 Drawing Sheet

(51) Int. Cl.
*H01M 2/34* (2006.01)
*H01M 10/0525* (2010.01)
*H01M 10/48* (2006.01)
*B60L 3/00* (2019.01)
*B60L 58/10* (2019.01)
*B60L 58/27* (2019.01)
*B60L 50/64* (2019.01)
*H02J 7/00* (2006.01)

(52) U.S. Cl.
CPC ............... *B60L 58/10* (2019.02); *B60L 58/27* (2019.02); *H01M 2/345* (2013.01); *H01M 2/347* (2013.01); *H01M 2/348* (2013.01); *H01M 10/0525* (2013.01); *H01M 10/48* (2013.01); *H01M 10/486* (2013.01); *B60L 2240/14* (2013.01); *B60L 2240/54* (2013.01); *B60L 2240/545* (2013.01); *B60L 2240/547* (2013.01); *H01M 2010/4271* (2013.01); *H01M 2200/00* (2013.01); *H01M 2220/20* (2013.01); *H02J 7/0031* (2013.01); *H02J 7/0068* (2013.01); *H02J 2007/0098* (2013.01); *Y02E 60/122* (2013.01); *Y02T 10/705* (2013.01); *Y02T 10/7011* (2013.01)

(58) Field of Classification Search
CPC ................. H01M 2/347; H01M 2/348; H01M 2010/4271; H01M 2200/00; H01M 2220/20; B60L 11/1851; B60L 11/1875; B60L 3/0046; B60L 2240/14; B60L 2240/54; H02J 7/0031; H02J 7/0068; H02J 2007/0098; Y02E 60/122; Y02T 10/7011; Y02T 10/705
See application file for complete search history.

(56) References Cited

U.S. PATENT DOCUMENTS

| 2006/0152190 | A1 | 7/2006 | Riemschneider | |
| 2014/0045036 | A1* | 2/2014 | Schaefer | H01M 2/206 |
| | | | | 429/156 |
| 2014/0125289 | A1* | 5/2014 | Tonomura | H02J 7/0029 |
| | | | | 320/134 |
| 2014/0356695 | A1 | 12/2014 | Abe et al. | |

FOREIGN PATENT DOCUMENTS

| JP | 2006-506787 A | 2/2006 |
| KR | 10-2012-0075398 A | 7/2012 |
| KR | 10-2012-0095893 A | 8/2012 |

OTHER PUBLICATIONS

International Search Report dated May 4, 2016 of corresponding International application No. PCT/EP2016/053217; 14 pgs.
Notification of Transmittal of Translation of the International Preliminary Report on Patentability dated Aug. 31, 2017, in connection with corresponding international application No. PCT/EP2016/053217 (6 pages).
Office Action dated Oct. 11, 2018 in corresponding Korean Application No. 10-2017-7025969; 11 pages including English-language translation.

* cited by examiner

SMART BATTERY CELL OF A BATTERY FOR A MOTOR VEHICLE

DESCRIPTION

Field

The invention relates to a battery cell for a battery of a motor vehicle. The battery cell comprises a battery cell housing, in which a galvanic element is accommodated. The battery cell can be electrically connected to at least one other battery cell of the battery by way of two electrical connections. In addition, the invention relates to a battery having a plurality of such battery cells and a motor vehicle having a battery.

Background

It is known from the prior art, e.g., from DE 10 2010 045 037 A1, to connect together a plurality of battery cells so as to provide a specific voltage or a specific current to a battery. Such batteries are employed today, in particular, as traction batteries in motor vehicles such as electric vehicles or hybrid vehicles for providing electrical drive power.

In the usual case, an electrical voltage is applied at the connections or battery poles of battery cells known from the prior art. Now if many battery cells are connected together in a serial connection, it is possible that high and dangerous voltages will result therefrom. For example, a traction battery for a motor vehicle can provide a voltage of several hundred volts. Correspondingly, special safety measures must be met in order to avoid endangering persons during operation of the battery and during the manufacture thereof. Namely, there exists the possibility that short circuits or hazardous electric arcs will occur. At the same time, enormous amounts of energy may be released abruptly as a consequence of a short circuit.

SUMMARY OF THE DISCLOSURE

The object of the present invention is therefore to create a battery cell, a battery, and a motor vehicle of the type named initially, which make possible a particularly safe operation.

The battery cell according to the invention has at least one switching element, which is designed for making and breaking a conductive electrical connection between an arrester of the galvanic element and at least one of the electrical connections. One can thus make or break the conductive electrical connection alternatively by means of the at least one switching element. This permits switching without voltage at least one of the electrical connections—and if two switching elements are provided, both electrical connections can be switched without voltage. Therefore, it can be provided that an electrical voltage is then applied only at the electrical connections of the battery cells when this is desired. This makes possible a particularly safe operation and handling of the battery cell. A battery cell whose electrical connections are switched without voltage can thus be manually handled without danger. Also, when there is a defect in the battery cell, the conductive electrical connection between the arrester and at least one of the electrical connections can be cut. In this way, there can no longer be any danger from this battery cell and operation is particularly safe.

The galvanic element is preferably designed as a secondary element, which can be discharged for supplying an electrical component and after discharging can be charged up again. In this case, in a way known in and of itself, the galvanic element comprises arresters, e.g., in the form of metal foils that are coated with the electrochemically active material of the electrodes of the galvanic element. In addition, an electrolyte is provided as well as a separator that separates the electrochemically active materials from one another. In such a galvanic element, the arresters can be present as stacked, folded, or coiled, so that the galvanic element is also called a cell stack or a cell coil.

Preferably, a first switching element is arranged between a first arrester of the galvanic element and one of the electrical connections, and a second switching element is arranged between a second arrester and the other of the two electrical connections of the battery cell. Due to the provision of a switching element being assigned to one of the particular arresters or to the particular electrical connection in each case, a particularly safe separation of the galvanic element from other battery cells of the battery can be ensured.

This is particularly of advantage when the battery cell housing is made of an electrically conductive material, such as aluminum, for example. Then, namely in the case when the galvanic element contacts the battery cell housing in an electrically conductive manner, the occurrence of a short circuit current through one of the electrical connections can be prevented thereby. It may also happen that electrical insulation between one battery cell and another battery cell or within the battery cell is defective. By opening both switching elements, thus by breaking or interrupting the conductive electrical connection between the respective arrester element and the respective electrical connection, it can then be ensured that the battery cell that is defective due to faulty insulation is electrically separated from the other battery cells.

In batteries of the prior art, the existence of an electrical isolation or insulation is monitored at the level of the battery. By providing an insulation monitor, i.e., a sensor that carries out a resistance measurement between the battery cell housing and at least one of the arresters, however, an insulation defect can be localized. Thus, the battery cell that is defective due to faulty insulation can be identified inside the battery. If such a defect occurs, the battery cell affected can be disconnected by breaking the conductive electrical connection. Additionally or alternatively, a warning can be emitted indicating that the battery cell has this defect.

Preferably, the at least one switching element is designed as a semiconductor component, which can be switched by means of a driver module. Then the switching pattern of the switching element can be adjusted or programmed as a function of a plurality of influence parameters. By providing such a driver module or driver for actuating the semiconductor component, the battery cell is granted an intelligence; thus the battery cell is designed as a so-called SmartCell ("intelligent battery cell"). This makes it possible to derive or to provide switching criteria, i.e., by depositing characteristic curves or characteristic curve fields in a memory of the driver module. In this way, the safe operation of the battery cell can be particularly well ensured.

The driver module is preferably disposed inside the battery cell housing. The driver module is then well protected. In addition, signals from sensors that detect parameters of the battery cells and are also found inside the battery cell housing for this purpose can be particularly well conveyed to the driver module.

The semiconductor component can be designed as a binary switch, in which the conductive electrical connection between the arrester and the at least one electrical connection is broken in one switching state and the conductive electrical connection is made in the other switching state.

This can be realized, for example, by providing a power transistor as the semiconductor component.

Alternatively, however, an electrical resistance of the semiconductor component can be variable by means of the driver module. Thus, a variable resistance or forward resistance from approximately zero can provide that the conductive electrical connection is produced, and a resistance down from approximately infinity can provide for the breaking of the conductive electrical connection. Also, in the design of the semiconductor component with the variable resistance, the semiconductor component can be provided by a power transistor.

For example, in the case of a battery with parallelly connected battery cells that have different internal resistances, the provision of a switching element with variable resistance can be utilized for the purpose of ensuring a uniform current flow through the parallelly connected battery cells. That is, differences in the internal resistances can be compensated by means of the variable resistance. A uniform loading of the parallelly connected battery cells, which is achievable in this way, leads to a particularly slow and, in particular, especially uniform aging of the parallelly connected battery cells.

The at least one switching element is preferably designed for low voltages and high currents. By way of example, it can be designed for voltages of up to 10 volts and for peak current intensities of up to 1000 A or more. The design, however, is dependent on the capacity of the respective battery cell.

In order to provide properties of this type, for example, a power disconnecting switch with reverse diode, e.g., a field-effect transistor, particularly, a MOSFET (metal-oxide semiconductor field-effect transistor), preferably a power MOSFET, can be utilized. Also, on the path between the arrester and at least one of the electrical connections, an electronic relay with two field-effect transistors (particularly with two MOSFETs) can be provided as a switching element, this relay being connected anti-serially, thus wherein the field-effect transistors that are electrically connected behind one another have reverse diodes with opposite forward direction. Therefore, the breaking of the conductive electrical connection in a particularly safe manner can be ensured. Additionally or alternatively, the at least one switching element can be designed as a gallium nitride switch (GaN switch) or similar switching element with a material of this type having a broad band gap, e.g., in the form of silicon carbide (SiC).

Semiconductor components of this type offer considerable advantages with respect to electrical properties, in particular with respect to the high current density or power density that is achievable for each semiconductor component. Also, such a particularly compact switching element can be provided, which additionally permits particularly high switching rates, in particular of several hundred kHz (and more). Also, semiconductor switches of this type permit particularly high operating temperatures of up to 250 degrees Celsius without the occurrence of irreversible damaging of the switching element. In addition, particularly low forward resistances that are accompanied by desirably small switching losses can be realized with the named semiconductor components.

In particular, the at least one switching element can be designed as a so-called gate injection transistor (GIT), e.g. as a GaN transistor of the self-blocking type. Such a GaN transistor namely has the above-named advantageous properties to a particularly great extent. Such a switching element cannot let through any current without control voltage at the gate terminal. It is found without control voltage, thus in the off state, in which the conductive electrical connection is interrupted. This is advantageous for safety reasons.

It has been shown as further advantageous if the driver module is coupled to the galvanic element for supplying the driver module with electrical power. Then the driver module applies the electrical power necessary for switching the switching element directly from the battery cell. This is not a problem, however, with respect to the electrical power provided by the battery cell, since the driver module makes do with a very small amount of energy, thus is preferably a low-power design, in particular, an ultra-low-power design.

Additionally or alternatively, for supplying the driver module, the module can be coupled to an electrical energy storage device, e.g. to a capacitor disposed in the battery cell housing. Providing such a separate energy storage device makes supplying electrical power to the driver module independent from the electrical power that supplies the galvanic element of the battery cell. Therefore, a safe switching of the switching element can always be ensured. In particular, such an electrical energy storage device can be charged along with the charging of the battery cell. If a battery having a plurality of battery cells is used in the vehicle, this can be produced, e.g., during the so-called recuperation operation. The separate energy storage device, however, can also be charged after connection of the battery to a current source.

It has been shown to be advantageous if at least one parameter from a group that comprises a current intensity of a current flowing through the battery cell can be determined by means of the driver module. In this case, the driver module is designed for the purpose of changing a switching state of the at least one switching element as a function of the at least one parameter. Thus it can be ensured, for example, that in the case of high short-circuit currents, e.g., currents with a current intensity of 2 kA to 4 kA, a safe separation, particularly a plurality of separations of the galvanic element from the connections or battery poles is produced, and thus the battery cell is disconnected. Therefore, an additional safety precaution is integrated into the battery cell.

Additionally or alternatively, for example, a temperature can be detected as the at least one parameter by means of at least one sensor coupled to the driver module. That is, if, for example, due to the operation of the switching element, the latter has a comparatively high temperature, its functionality can be adversely affected. In such a case, the driver module can provide that the switching state of the at least one switching element can only be changed if the switching element is again cool enough to be able to safely detect its switching function. Thus a protection against excess temperature is integrated and a safe separation is ensured, e.g., in the case of a possible short circuit.

Additionally or alternatively, however, it is also possible that in the case of a temperature that is too high, the switching state of the at least one switching element will be changed in such a way that the conductive connection is broken. Therefore, the battery cell can be safely disconnected in the case of a possible short circuit.

Also, in the case of a temperature load from outside the battery cell, thus with application of heat that is not caused by processes within the battery cell, for safety, the driver module can actuate the switching element and break the conductive electrical connection. This may be the case, for example, if there is an input of heat into the battery cell as a consequence of a fire in another battery cell or another component of the battery (or of a component adjacent to the battery). Information on such heat loads occurring in the battery cell or acting on the battery cell from the environment of the battery cell can be communicated preferably by means of the driver module, e.g., to an overriding control device of the battery. Additionally or alternatively, such information can be stored in a memory of the driver module and can be read out if needed.

It has also been shown as advantageous, if a voltage and/or a pressure and/or a property of an electrolyte of the galvanic element and/or an acceleration can be detected by means of at least one sensor coupled to the driver module or by means of the driver module itself, wherein the driver module is designed for the purpose of changing the switching state of the at least one switching element as a function of at least one such parameter.

Thus, for example, when a threshold value of such a parameter is exceeded, the conductive electrical connection between the arrester and the electrical connection can be broken. In this way, in particular, it can be provided that a defective battery cell can be galvanically separated from a battery cell system of the battery.

In particular, a protection against overcharging can be provided, if, e.g., the battery cell is disconnected or released when a maximum value of the temperature, the current intensity or the voltage is exceeded. Also, such a self-disconnection of the battery cell can be produced according to a kind of safety fuse when maximum values, e.g., of temperature, current intensity, pressure, or the like are exceeded.

The safety of the battery cell is taken care of, in addition, if the switching state of the at least one switching element is changed as a function of acceleration. Thus, e.g., in the case of a crash of a motor vehicle equipped with the battery, it can be provided that there is a voltage disconnection of the battery cell.

Preferably, the driver module is designed for the purpose of examining the functionality of the at least one switching element. Therefore, a self-diagnosis function can be integrated into the driver module, with which, e.g., the at least one switching element can be examined at predeterminable time intervals. For this, measurements can be conducted on the switching element by means of the driver module, and these measurements provide information on its state.

Such a self-diagnosis can be provided or can be initiated externally at pre-specifiable, programmable time intervals. For example, such an inquiry of the state of the switching element or of its functionality can be initiated by an external control device, e.g., in the form of a microprocessor of a battery management system. Thus, if there is a defect in the switching element, a permanent interruption of the conductive electrical connection can be provided. On the other hand, it can be determined by examining the switching element whether the switching element can be reliably brought into its different switching states. The presence of a defective switching element can then be communicated to an operator and the switching element can be replaced if needed.

In addition, it is preferred if the driver module is designed for communicating with a control device for the battery. For this, a wired and/or wireless communication can be provided. Thus, a defect and/or a particular switching state of the switching element can be communicated to the control device, e.g., to a battery management system. Also, the control device can actuate the driver module; and thus in particular, with respect to the state of the entire battery, the driver module, which actuates the switching element, can make or break the conductive electrical connection.

It has been shown to be further advantageous if, by applying a control voltage, the at least one switching element can be changed from a switching state breaking the conductive electrical connection between the arrester and the at least one electrical connection to a switching state producing this conductive electrical connection. Then, in the voltage-free state the switching elements are open and the battery poles or connections are also without voltage. Thus, a voltage cannot be applied inadvertently to the connections, but rather for this, the control voltage must be applied.

The switching element can be disposed at the particular arrester or at the particular connection. For this, the switching element, which is designed, for example, as a semiconductor component, can be disposed on a connection frame or lead frame, which in turn is joined, e.g., to the arrester, for example, by welding, crimping or by force-fitting, in particular by a press fit. The lead frame can also be disposed in an analogous way at the electrical connection or terminal of the battery cell. Such an arrangement of the switching element is particularly advantageous with respect to the structural space available inside the battery cell housing. Also, a heat-conducting contact between the switching element, in particular the semiconductor component, and the battery cell housing can be particularly well produced. In this way, heat can be particularly well drawn off from the switching element.

In another advantageous configuration, the battery cell comprises means for irreversibly interrupting an electrical contact between the at least one switching element and the arrester and/or the at least one electrical connection. By activating the means, the switching element can be disrupted in such a way that the conductive electrical connection is permanently broken according to a type of self-destruct function. This in fact makes the individual battery cell unusable, but damage to other battery cells of the battery can be averted.

Another switching means, for example, a relay and/or a semiconductor switching element can be connected to the two connections of the battery cell by way of respective current bus bars. If the switching means is opened, then current cannot flow over the current bus bars (and the switching means) by way of the connections of the battery cell. Thus, in the opened state, the battery cell can be used as intended for providing electrical power and/or for charging. If, however, the switching means is closed, then current can flow over the bus bars and the switching means between the connections of the battery cell. In this case, the galvanic element of this battery cell is bypassed.

Thus, if the driver module has determined any damage, e.g., based on the sensor data, the driver module can also actuate the closing of the other switching means. This option of bypassing or bridging over is particularly advantageous in the case of a serial connection of battery cells. That is, if one of the serially connected battery cells is defective, thus is damaged, then this battery cell can be bypassed by closing the switching means.

If the damaged battery cell is connected in series to other similar battery cells and the current flow through the damaged battery cell is interrupted, then the current flow is interrupted in the serial connection. By engaging the switching means, however, the defective battery cell can be bypassed in a simple way and the current can be conducted via the switching means of the defective battery cell to the adjacent battery cells. Expressed in another way, a current flow can be maintained inside the serial connection, and thus functionality of the entire battery can be maintained. In this way, the battery, which is disposed, for example, in the motor vehicle to drive the motor vehicle, can additionally provide electrical power. Correspondingly, in an advantageous way, a driver of the motor vehicle has the option of visiting a repair facility. The switching means and the bus bars can be disposed, in particular, inside the battery cell housing.

The irreversible interruption of the electrical contact can be effected, in particular, by a chemical reaction and/or by an increase in temperature and/or by a pressure. For example, the electrical contact can be burned through like a type of fuse by a heat loading, if a sufficiently high temperature is produced very locally and for a long enough time. This temperature may lie, for example, at over 300degrees Celsius and an autonomous deactivation of the battery cell may ensue thereby. The irreversible interruption can be brought about, for example, by local heating or pyrotechnically or by the chemical reaction, which in turn can be triggered thermally or by increasing pressure. For example, reactive chemicals that release heat locally by a reaction with one another and/or bring about the occurrence of a correspondingly high pressure can be used for breaking down the electrical contact.

When such a special unit or a package of chemicals is used, the latter are preferably constituted in such a way that they do not react with the electrolyte of the galvanic element or with other components of the battery cell, in particular, with the driver module, or they do not corrode the electrolyte or the component. Thus, it will be reliably avoided that a premature triggering of the self-destruct function and thus a deactivation of the battery cell will be brought about.

Additionally or alternatively, the means for deactivating the galvanic element can be designed, e.g., by chemically deactivating the electrolyte of the galvanic element or making it harmless. That is, all other chemical reactions of the galvanic cell are then also prevented. In addition, such a self-destruct function can be brought about by providing a unit containing chemicals that is arranged inside the battery cell housing. Such a unit can be triggered electrically or by a chemical reaction in order to bring about the deactivation of the galvanic element as a consequence.

Finally, it has been shown to be advantageous if the switching state of the switching element can be detected from outside. This is of advantage, for example, for shipping, storing, and assembling the battery from the battery cells, since then it can be easily determined from outside the battery cell housing whether or not a voltage is applied to the electrical connections of the battery cell.

For example, when the switching element is closed, a changing electrical or magnetic field can be detected inside the battery cell and such a signal can be intensified. In this way, an external, active indicator can be provided. However, a passive indicator can also be provided externally on the battery cell housing, e.g., a light, in particular an LED, whose light provides information on the switching state of the at least one switching element. In particular, such an LED can be provided with the electrical power that supplies the galvanic element. Therefore, no external energy source is required. However, a wireless transfer of energy, e.g., via light waves may also be provided.

By means of the above-described switchable battery cell, the functional safety of the battery cell itself as well as all components of the same can be ensured according to internationally specified safety requirements, for example, according to the D level of the ASIL (Automotive Safety Integrity Level, level of integrity with respect to safety in mobile applications).

Also, a determination of whether the switching element is opened or closed can be reliably made according to the D level of the ASIL.

The battery according to the invention comprises a plurality of battery cells according to the invention, which can be connected in series and/or in parallel.

The motor vehicle according to the invention comprises at least one battery according to the invention. The motor vehicle can be designed, for example, as a passenger car, in particular as an electric vehicle or a hybrid vehicle. In addition, the motor vehicle may also involve an electrically driven motorcycle or an electrically driven bicycle.

It is additionally possible to provide the battery in a stationary energy storage system. Furthermore, it may be provided that the battery, which has been supplied in a motor vehicle, will be used again as a so-called second-life battery, thus whereby the battery will be introduced for another kind of use. In particular, for second-life applications, the requirements, e.g., for the capacity of battery cells, can be less than with use of battery cells for the battery of a motor vehicle.

The advantages described for the battery cells according to the invention and preferred embodiments apply also to the battery according to the invention and to the motor vehicle according to the invention.

BRIEF DESCRIPTION OF THE DRAWINGS

The features and combinations of features named in the preceding description, as well as the features and combinations of features named below in the description of the figures and/or in the figures alone can be used not only in the combination indicated in each case, but also in other combinations or alone, without departing from the scope of the invention. Thus, embodiments that are not explicitly shown or explained in the figures, but proceed from the explained embodiments and can be produced by separate combinations of features, are also to be viewed as comprised and disclosed by the invention.

Other advantages, features, and details of the invention result from the claims, the following description of preferred embodiments, as well as based on the drawings. Here:

DETAILED DESCRIPTION OF THE DRAWINGS

Figure 1:
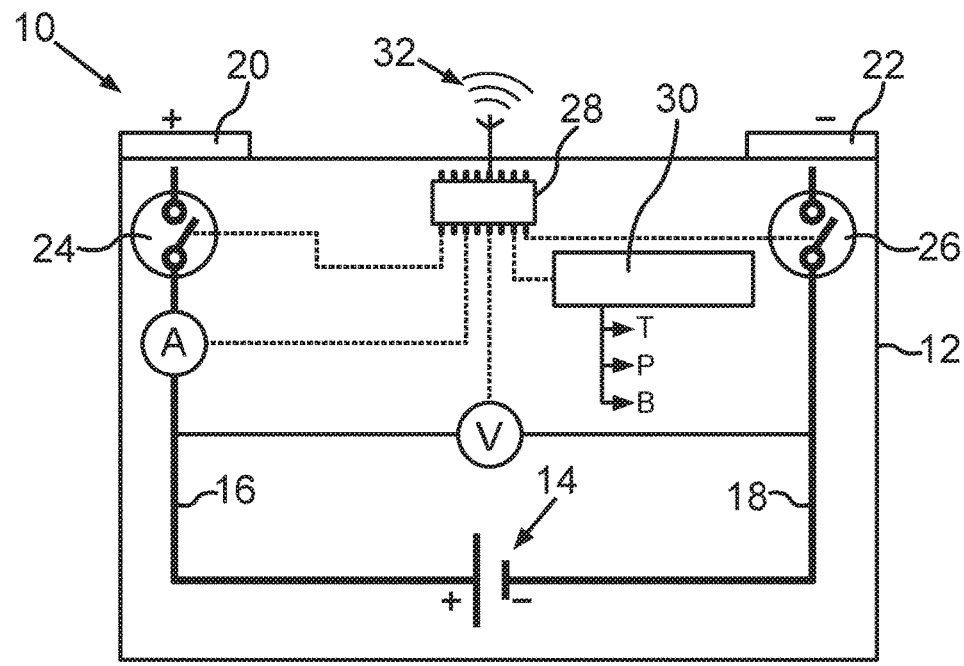
FIG. 1 schematically shows a battery cell for a battery of a motor vehicle, in which semiconductor switching elements are disposed between the electrodes of a galvanic element of the battery cell and the electrical poles of the battery cell, the switching elements being able to be actuated by a driver module in order to interrupt a conductive electrical connection between the electrodes and the poles.

A battery cell 10 as can be employed, for example, in a battery of a motor vehicle is shown schematically in FIG. 1. The battery cell 10 can be designed, e.g., as a lithium ion cell for this purpose. In a battery, as it is used as a traction battery for a motor vehicle, usually a plurality of such battery cells 10 are electrically connected in series and/or in parallel, in order to supply correspondingly high voltages and currents.

In a serial connection of such battery cells 10, a very high voltage, in fact a voltage of several hundred volts of the battery, can occur overall, since a plurality of battery modules, each of which contains a multiple number of battery cells 10, are connected together in an electrically conductive manner. These high voltages, and also the occurrence of short circuits or electric arcs, can be associated with a danger to persons. An endangering of this sort must be avoided or reduced. The latter can be achieved by the battery cell 10 described with reference to the figures.

The battery cell 10 comprises a battery cell housing 12, which is presently designed as a prism by way of example. A galvanic element 14 that comprises arresters 16, 18, each of which is coated with a particular electrochemical material, is disposed inside the battery cell housing 12. Presently, in order to simplify, of the electrochemically active material and the electrodes of the galvanic element 14 comprising the arresters 16, 18, only the arrester 16 leading to a first electrical connection 20 (e.g., a plus pole) of the battery cell 10 and the arrester 18 leading to a second electrical connection 22 of the battery cell 10, thus the arrester 18 leading to the minus pole, are shown.

In the battery cell 10 shown in FIG. 1, however, it is possible to electrically separate the galvanic element 14 from the connections 20, 22. For this purpose, a first switching element 24 is provided, by means of which a conductive electrical connection between the arrester 16 and the connection 20 can be interrupted by opening the switching element 24. The conductive electrical connection between the arrester 16 and the connection 20 can be produced by closing the switching element 24.

In an analogous way, a second switching element 26 is provided, by means of which the conductive electrical connection between the arrester 18 and the connection 22 can be produced or interrupted. The switching elements 24, 26, which can be designed, for example, as semiconductor components, are presently switched by a driver module 28, which, just like the switching elements 24, 26, is disposed inside the battery cell housing 12. The intensity of the current flowing through the battery cell 10, for example, can be detected by means of the driver module 28. In the case when the current is too high, as occurs, e.g., in a short circuit, the driver module 28 can then effect an opening of the switching elements 24, 26, e.g., by preventing the application of a control voltage to the switching elements 24, 26. Likewise, an opening of the switching elements 24, 26 can be effected as a function of a maximum value, for example, of the voltage of the battery cell 10 detected by means of the driver module 28.

By providing the driver module 28, the battery cell 10 is granted an intelligence that permits it to dynamically program the switching pattern of the switching elements 24, 26, as a function of a plurality of influence parameters. For this, the driver module 28 may take into account other parameters that are detected, for example, by sensors 30 disposed inside the battery cell housing 12 or outside the battery cell housing 12. Such sensors 30 can detect, for example, a temperature, a pressure, accelerations, in particular accelerations in three directions perpendicular to one another, a property of an electrolyte of the galvanic element 14, and the like. By taking into consideration parameters of this type, multiple criteria for connection and disconnection can be established, e.g., by way of characteristic curve fields. Therefore, a making or breaking of the electrical connection between the arresters 16, 18 and the electrical connections 20, 22, can be provided as a function of a multiple number of the named parameters.

For changing the switching state of the switching elements 24, 26, information that will be transmitted to the driver module 28 from an overriding position can also be drawn on, e.g., from a control device as is present in a battery management system. A wireless communication connection 32 of the driver module 28, for example, provided for this is shown in FIG. 1. Thus, by way of example, it can be provided for this purpose that an individual, defective battery cell 10 is disconnected, whereas, moreover, the other battery cells 10 of the battery can provide electrical power for the driving of the vehicle.

The driver module 28 can be provided with the electrical power that supplies the galvanic element 14. Additionally or alternatively, for providing the very small amount of energy that the driver module 28 requires, a separate energy storage device, e.g., in the form of a small capacitor, can be provided.

In the case of the battery cell 10 shown in FIG. 1, the normal switching state of the switching elements 24, 26, which are preferably designed as semiconductor components, is open, so that both battery poles or connections 20, 22 are usually without voltage. By applying the switching elements 24, 26 with the control voltage by way of the driver module 28, the conductive electrical connection between the galvanic element 14 and the electrical connections 20, 22 is then produced.

In the battery cell 10 shown in FIG. 1, the switching elements 24, 26 can only be opened or closed, whereby when the switching elements 24, 26 are closed, a maximum flow of current through the particular switching element 24, 26 is made possible. For this purpose, for example, the switching elements 24, 26 can be designed as power transistors.

Figure 2:
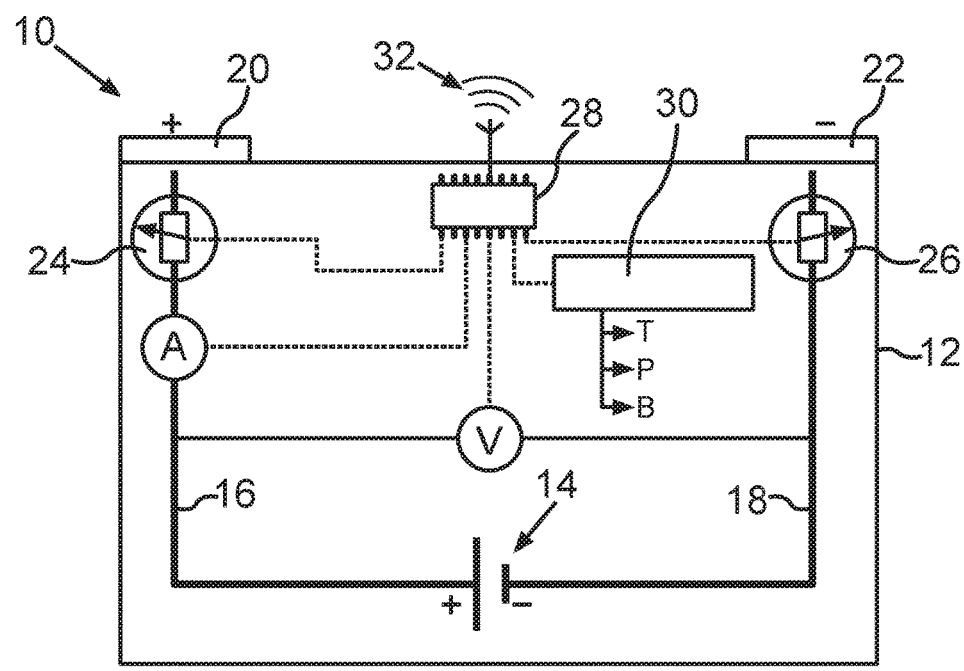
FIG. 2 schematically shows the battery cell according to FIG. 1, but wherein a resistance of the semiconductor switching element can be changed by means of the driver module.

In contrast, in the battery cell 10 shown in FIG. 2, a resistance of the switching elements 24, 26 can be changed by means of the driver module 28. Such switching elements 24, 26 can also be designed as semiconductor components, for example, as power transistors with variable forward resistance. The conductive electrical connection between the arresters 16, 18 and the electrical connections 20, 22 in the case of maximum resistance (R=∞) can be interrupted by means of such switching elements 24, 26. However, in addition, by changing the resistance, the current flowing over the switching elements 24, 26 can be varied. This is advantageous, for example, when parallelly connected battery cells 10 should be loaded evenly, but the battery cells 10 have different internal resistances.

The switching elements 24, 26 can be arranged, for example, at the arresters 16, 18, which are formed as collecting contacts, e.g., by welding them, crimping them, or attaching them by press fitting. The switching elements 24, 26, however, can also be integrated into the connections 20, 22, which are also called terminals of the battery cell 10. The cooling of the switching elements 24, 26 can be produced by way of the battery cell housing 12.

Due to the fact that the driver module 28 detects parameters such as the current intensity and the voltage, and/or measurement values that concern the temperature, the pressure, accelerations, and the like are transmitted via the sensors 30, the switching elements 24, 26 can be equipped with an integrated self-triggering function. Therefore, if maximum values of the named parameters are exceeded, the conductive electrical connection can be interrupted. Thus, an automatic disconnection can be produced analogous to a safety fuse, but which is reversible.

In particular, by detecting the temperature inside the battery cell housing 12 or even outside the battery cell housing 12, a protection against over-temperature can be realized, by which it is ensured that an activation of the battery cell 10 will then be produced only if the particular switching element 24, 26 is sufficiently cool. Thus, since a short circuit is always possible, the conductive electrical connection between the arresters 16, 18, and the connections 20, 22 can be safely interrupted. However, also in the case of a temperature that is too high, an automatic activation or an automatic disconnection of the battery cell 10 can be produced for protection.

Additionally, an irreversible breakdown of the switching elements 24, 26 or the electrical contacts thereof to the electrical connections 20, 22 and/or to the arresters 16, 18 is possible. For example, a special package can be provided for this inside the battery cell housing 12, the package providing a temperature of more than 300 degrees Celsius, for example, safely, locally, and over a sufficiently long time span, and thus an autonomous deactivation of the battery cell 10 is produced. Such a self-destruction can be triggered by an electrical signal, e.g., by heating, or pyrotechnically as in the release of an airbag, or by way of a chemical reaction. In this case, a thermal shock or an elevated pressure can provide for the triggering of the chemical reaction. Such a package containing chemicals—for example, triggered electrically or by a chemical reaction—can also provide that the electrolyte of the galvanic element 14 is chemically deactivated or is made harmless. Then the chemical reactions of the galvanic element 14 that lead to providing an electrical voltage to the galvanic element 14 are also prevented.

The driver module 28 may have a self-diagnosis function, e.g., according to a type of built-in self-test (BIST), in order to initiate a self-diagnosis, for example, at programmable time intervals. Such an inquiry as to the functionality of the switching elements 24, 26 may also be initiated, however, by an external trigger, such as, for example, the microprocessor of the battery management system.

The invention claimed is:

1. A battery cell for a battery of a motor vehicle, comprising:
   a battery cell housing, in which a galvanic element is accommodated, and having two electrical connections, by way of which the battery cell can be electrically connected to at least one second battery cell, wherein the battery cell and the at least one second battery cell are arranged in the battery of the motor vehicle,
   wherein at least one switching element is designed for making and breaking a conductive electrical connection between an arrester of the galvanic element and at least one of the electrical connections,
   wherein the galvanic element is electrically connected to the at least one of the electrical connections via the arrester and the at least one switching element in the battery cell housing, and
   wherein a driver module is provided in each of the battery cell and the at least one second battery cell, the driver module is disposed inside the battery cell housing, and the at least one switching element is controlled by the driver module so that the conductive electrical connection between the arrester and the at least one of the electrical connections are controlled, wherein the driver module prevents releasing of dangerous levels of voltages and diagnoses if an individual battery cell is defective.

2. The battery cell according to claim 1, wherein the at least one switching element is a semiconductor component that can be switched by the driver module.

3. The battery cell according to claim 2, wherein an electrical resistance of the semiconductor component can be varied by the driver module.

4. The battery cell according to claim 2, wherein in order to supply the driver module with electrical power, the driver module is coupled to the galvanic element and to an electrical energy storage device.

5. The battery cell according to one of claim 2, wherein by the driver module and by at least one sensor coupled to the driver module, at least one parameter can be detected from a group comprising:
   a current intensity of a current flowing through the battery cell;
   a voltage;
   a temperature;
   a pressure;
   a property of an electrolyte of the galvanic element; and
   an acceleration,
   wherein the driver module changes a switching state of the at least one switching element as a function of the at least one parameter.

6. The battery cell according to claim 2, wherein the driver module, which communicates with a control device of the battery, examines the functionality of the at least one switching element.

7. The battery cell according to one of claim 1, wherein by applying a control voltage, the at least one switching element, which is disposed, at the arrester or at the connection, can be changed from a switching state breaking the conductive electrical connection between the arrester and the at least one electrical connection to a switching state producing the conductive electrical connection.

8. The battery cell according to one of claim 1, further comprising:
   means for irreversibly breaking down an electrical contact between the at least one switching element and the arrester and the at least one electrical connection and for deactivating the galvanic element,
   wherein the irreversible breaking is brought by at least one of a chemical reaction, an increasing of a temperature and an elevating of a pressure.

* * * * *